United States Patent [19]

Marquardt

[11] Patent Number: 4,684,464
[45] Date of Patent: Aug. 4, 1987

[54] APPARATUS FOR WASHING MATERIAL

[75] Inventor: Kurt Marquardt, Holzgerlingen, Fed. Rep. of Germany

[73] Assignee: Hager + Elsasser GmbH, Stuttgart, Fed. Rep. of Germany

[21] Appl. No.: 811,508

[22] Filed: Dec. 20, 1985

[30] Foreign Application Priority Data

Dec. 24, 1984 [DE] Fed. Rep. of Germany ....... 3447416

[51] Int. Cl.$^4$ ............................................. B01J 49/00
[52] U.S. Cl. ..................................................... 210/189
[58] Field of Search ................ 210/675, 676, 189, 269

[56] References Cited

U.S. PATENT DOCUMENTS

| | | | |
|---|---|---|---|
| 3,130,151 | 4/1964 | Levendusky | 210/675 |
| 3,915,861 | 10/1975 | Marquardt | 210/189 |
| 4,033,874 | 7/1977 | Marquardt et al. | 210/189 |
| 4,148,727 | 4/1979 | Marquardt | 210/675 |
| 4,519,916 | 5/1985 | Martinola | 210/189 |

*Primary Examiner*—Ivars Cintins
*Attorney, Agent, or Firm*—Chilton, Alix & Van Kirk

[57] ABSTRACT

A liquid treatment system, for example a water purification system, includes a treatment vessel which contains a bed of ion-exchange or adsorption material. The system also includes a washing vessel to which batches of the material comprising the bed in the treatment column are transferred for the flushing of contaminates therefrom, the washed material subsequently being returned to the treatment vessel. The material supply and discharge arrangement for the washing vessel is designed such that the quantity of treatment material withdrawn from the treatment vessel may be selected and will be self-limited.

18 Claims, 3 Drawing Figures

APPARATUS FOR WASHING MATERIAL

BACKGROUND OF THE INVENTION

(1) Field of the Invention

The present invention relates to the washing of materials used in the treatment of liquids and particularly to the rinsing of ion-exchange and adsorption materials employed in water purification systems. More specifically, this invention is directed to washing columns for use in association with operating columns which are charged with ion-exchange or adsorption materials and especially to apparatus for use in the rinsing of contaminates from resinous materials employed in ion-exchange process vessels and from adsorption materials utilized in filtration or other similar liquid treatment process vessels. Accordingly, the general objects of the present invention are to provide novel and improved methods and apparatus of such character.

(2) Description of the Prior Art

While not limited thereto in its utility, the present invention is particularly well-suited for use in the treatment of water. One known water treatment technique is the fixed-bed ion-exchange process wherein the liquid to be cleansed is caused to interact with an ion-exchange material, typically a cation or anion resin or a mixture thereof. Such ion-exchange processes typically provide for regeneration of the ion-exchange material and may include a washing step wherein contaminate particles are rinsed from the ion-exchange material which is subsequently returned to an operating column. Filtration systems which employ an adsorption material in the operating column, and also include a washing column for the adsorption material, are also known.

It has been proposed to provide a level-adjusting device in the operating column of an ion-exchange or filtration process to determine the quantity of ion-exchange or adsorption material to be withdrawn from the operating column for delivery to the washing column. An example of such a level-adjusting device may be seen from published German Patent Application No. 22 46 792. In the apparatus of this application the level-adjusting device is an immersion tube which is introduced into the end of the operating column, the depth of immersion determining the volume of ion-exchange or adsorption material to be drawn off. An alternative technique, disclosed in German Patent No. 22 25 682, utilizes a distributor for the inflowing untreated water as the level-adjusting device. Such a water distributor is funnel-shaped and the space in the column thereunder determines the volume or portion of the charge in the operating column which will be drawn off. It is also known to employ a separate measuring column in the system between the operating and washing columns. An example of use of such a separate measuring column being found in German Patent No. 24 03 274.

The above-briefly described prior art techniques and systems are relatively complicated and thus comparatively expensive to physically implement. The technique embodied in the use of a funnel-shaped water distributor has the further disadvantages that it is not applicable to use in a system which does not have an operating column with such a untreated water distributor and a relatively flat bottom.

SUMMARY OF THE INVENTION

The present invention overcomes the above-briefly described and other disadvantages and deficiencies of the prior art and, in so doing, provides a reliable and uncomplicated technique for ensuring that a predetermined volume of ion-exchange or adsorption material will be withdrawn from an operating column and delivered into the washing column of a liquid treatment system. In the practice of the present invention the intake of the drain or material withdrawal conduit in the operating column can be located at any height. Accordingly, the present invention offers the significant advantage that the ion-exchange or adsorption material can be removed at any desired level of the operating column.

In a water treatment system in accordance with the present invention each washing column is provided with one or more transport water drain/supply tubes which project into the column. The intake/discharge ends of these drain/supply tubes are permeable to water but not to the ion-exchange or adsorption material to be washed. The transport water drain/supply tubes are preferrably vertically adjustable so that the level of the uppermost intake/discharge opening therein corresponds approximately to the desired filling level in the washing column of the material to be washed. This filling level, accordingly, may be selected and will be independent of the immersion depth of the drain conduit in the associated operating column, the material to be washed being withdrawn from the operating column for delivery to the washing column via the said drain line in the operating column.

BRIEF DESCRIPTION OF THE DRAWING

The present invention may be better understood, and its numerous objects and advantages will become apparent to those skilled in the art, by reference to the accompanying drawing wherein like reference numerals refer to like elements in the several figures and in which.

DESCRIPTION OF THE DISCLOSED EMBODIMENT

Figure 1:
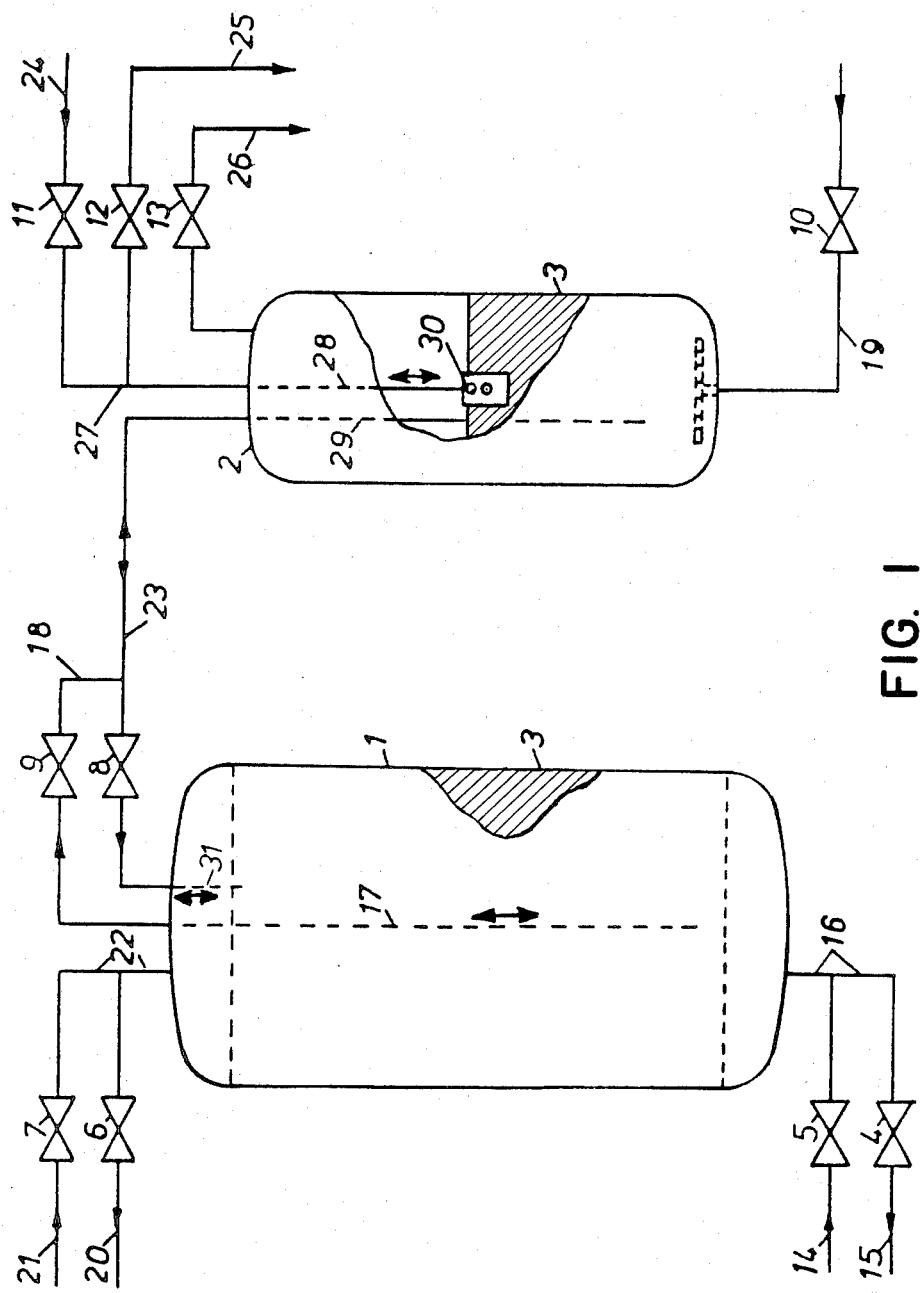
FIG. 1 is a schematic illustration of an ion-exchange liquid treatment system employing a washing column which functions in accordance with the present invention.

Referring to FIG. 1, an ion-exchange water purification system is shown schematically. It is to be noted that while the system of FIG. 1 will be discussed in terms of ion-exchange technology, substantially the same apparatus may be employed in a filtration system which employs a bed of adsorption material rather than ion-exchange material. The system of FIG. 1 includes a first vessel 1, which functions as an operating column, and a second vessel 2, which functions as a washing column. The operating or ion-exchange column is substantially filled with an ion-exchange material 3 which is contained in a fixed bed. The liquid to be treated, e.g., raw or unpotable water, is delivered into the bottom of column 1 via supply lines 14, 16, a shut-off valve 5 being installed in supply line 14. The treated water is drawn off at the top of column 1 and delivered to the user via discharge conduit system 20, 22, a shut-off valve 6 being installed in conduit 20. The ion-exchange material 3 may be withdrawn from column 1 only via a drain conduit 17 and delivered, via conduits 18 and 23, to the washing column 2. A shut-off valve 9 is installed in conduit 18. Ion-exchange material may be returned to the ion-exchange column 1, after washing, via conduit 23 and a feed tube 31, a shut-off valve 8 being installed in conduit 23 downstream of the junction with conduit 18 in the direction of travel of washed material 3. The liquid being treated flows through the bed of ion-exchange material 3 with a certain flow rate and purification thereof by means of an ion-exchange process occurs during this flow. As a result of the ion-exchange process, solids and suspended matter from the raw or untreated water delivered to the bottom of column 1 will collect on the ion-exchange material 3.

In time, the ion-exchange material becomes strongly permeated, i.e., contaminated, with matter which is precipitated out of the inflowing untreated water. The contamination of the ion-exchange material is particularly prevelant in the region of the untreated water inlet, i.e., near the bottom of column 1. When a predetermined pressure differential is measured across the bed of ion-exchange material, or a predetermined colloid index or turbidity value is sensed, ion-exchange material 3 to be washed is transferred from operating column 1 into washing column 2. The transfer may also be performed as a function of time or the quanity of water which has passed through the ion-exchange material. There are several possible modes of ion-exchange material transfer from the operating column to the washing column. Thus, in a "continuous" mode of operation, the transfer may be accomplished without interrupting the supply of untreated water in which case the valve 5 will remain open and the valve 9 will be opened. As an alternative to the above-described "continuous" mode, the operating column 1 may be caused to function in a discontinuous matter in which case the valves 5 and 6 will be closed and water for transporting the ion-exchange material to the washing column will be supplied via conduit 21 and valve 7, the withdrawn ion-exchange material again passing through open valve 9. As an alternative discontinous mode of operation, both of valves 6 and 7 will be closed and valves 5 and 9 opened. In this mode of operation the immersion depth of the intake end of drain conduit 17 may be set at any desired level in operating column 1.

It is to be noted that the transport water supply conduit 21 will also serve as a feed line for the chemicals, particularly HCl NaOH, which are required for regeneration of the ion-exchange resin in column 1.

The "unloading" of washing column 2, i.e., the withdrawal of water from the vessel, is accomplished via a transport drain/supply tube 28, conduit 27, valve 12 and conduit 25. The tube 28 is also employed, in the manner to be discussed below, as a feed for transport water which will cause the back-transport of the washed ion-exchange material 3 to operating column 1.

In order to transfer ion-exchange material 3 from operating column 1 into the washing column 2 for cleansing, the valves 9 and 12 will be opened and, depending on the mode of operation, liquid will be fed to operating column 1 to force a charge, consisting of a mixture of transport water and ion-exchange material, through the drain conduit 17, the conduits 18 and 23 and into a tube 29 which projects into column 2. The transport water, and the water present in column 2 up to the level of the uppermost inlet opening 30 in the transport water drain/supply tube 28, will be drawn off from column 2 via valve 12 and conduit 25. Since the inlet opening or openings 30 for drain/feed tube 28 are permeable to water, but are impermeable to the material being washed, when the material 3 reaches approximately the level of the uppermost inlet opening 30 of tube 28, the withdrawal of additional material 3 from operating column 1 will be automatically terminated as a result of the standing water column in the washing column 2 above the level of the uppermost of said inlet openings 30. The volume of ion-exchange or adsorption material transported to the washing column is thus determined by the height of the drainage system therein. The height of the drainage system, i.e., the level of the uppermost of inlet openings 30 in tube 28, may be monitored by sensing flow in conduits 18 or 23 between valve 9 and washing column 2 and/or by suitable sensors associated with washing column 2 itself. After termination of ion-exchange resin or adsorption material transfer, during the "continuous" operation mode discussed above, the valves 9 and 12 will be closed. During a discontinuous mode of operation, upon termination of the transfer, the valve 7 will be closed if transport water is supplied via conduit 21 rather than via conduit 14, and valves 9 and 12 will be closed. The washing column 2 is flushed, also after termination of the transfer of the material to be washed thereto from the operating column 1, by wash water which is supplied through conduit 19 and valve 10 into the bottom of washing column 2. The wash water will be discharged from column 2 via conduit 26 which has a shut-off valve 13 installed therein.

When the washing operation is completed, the valves 10 and 13 will be closed. The ion-exchange or adsorption material 3, which is now substantially free of contaminate particles, will now be transported back to operating column 1 via tube 29, conduit 23, valve 8 and the feed tube 31 which extends into column 1. Transport water for moving the material 3 back to the operating column is supplied via conduit 24, which includes a shut-off valve 11, conduit 27 and the drain/supply tube 28. In the case of an operating column which functions as a cation exchanger, the transport water will be decationized water but may be untreated water. If operating column 1 is an ion-exchanger, the transport water will be decationized water. If the operating column 1 is functioning as a filtration vessel, the transport water may be untreated and/or filtered water depending upon the content of suspended matter in the untreated water. In any event, during the return of the washed material 3 to operating column 1, the valves 8 and 4 will be in the open state with unloading of column 1 being accomplished via open valve 4 and lines 15 and 16. The same flow path will also serve as the discharge for regeneration chemicals and rinsing water. When the charge of washed material has been returned to the top of operating column 1 via feed tube 31, the valves 11, 8 and 4 will be closed and the flushing process ended. The next operational procedure will normally be the regeneration of the material 3 if the operating column 1 is operating as an ion-exchanger. Once the washing and regeneration steps have been completed, treatment of raw water or other liquid will continue in operating column 1 and the valves 5 and 6 should thus be in the open condition.

The level of the uppermost inlet opening 30 in the drain/supply tube 28 is optionally set during a test operation for determining the volume of ion-exchange or adsorption material to be transported from operating column 1 to washing column 2. Alternatively, the tube 28 may be vertically adjustable, as indicated schematically by the double-ended arrow, in order to ascertain the optional level during operation. This optional level may thus be independently adjusted and may be a function of immersion depth of the feed tube 31 and/or the drain tube 17. It is thus possible for the position of the ends of tubes 17 and 31 to also be vertically adjustable.

Figure 2:
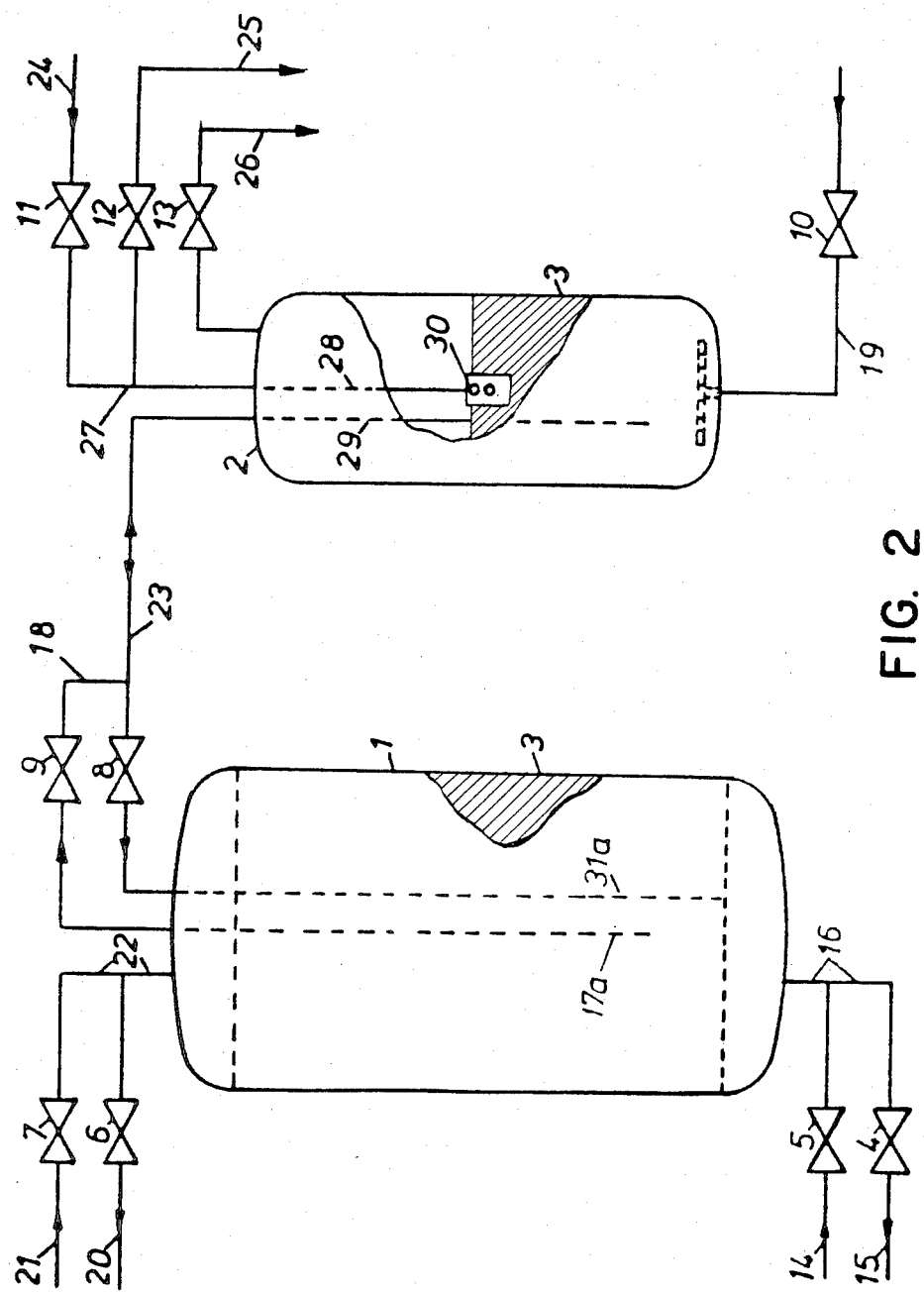
FIG. 2 is a schematic illustration of another ion-exchange liquid treatment system in accordance with the invention with operating and washing columns, the washing column.

Referring now to FIG. 2, the installation illustrated schematically differs from that of FIG. 1 in that the washed ion-exchange or adsorption material 3 is returned via feed tube 31a to the lower part of operating column 1. The operation of a system in accordance with FIG. 2 is thus otherwise similar to that described above in the discussion of FIG. 1. However, in one mode of operation of the FIG. 2 installation, the ion-exchange material 3 remaining in operating column 1 subsequent to the transfer of a "charge" to the washing column 2 will be regenerated internally and then washed. It is to be noted that the feeding of the washed ion-exchange material 3 into the lower part of operating column 1 has the advantage that such washed material is always located under a layer of regenerated ion-exchange material and thus the maximum purification of the liquid being treated is assured.

Figure 3:
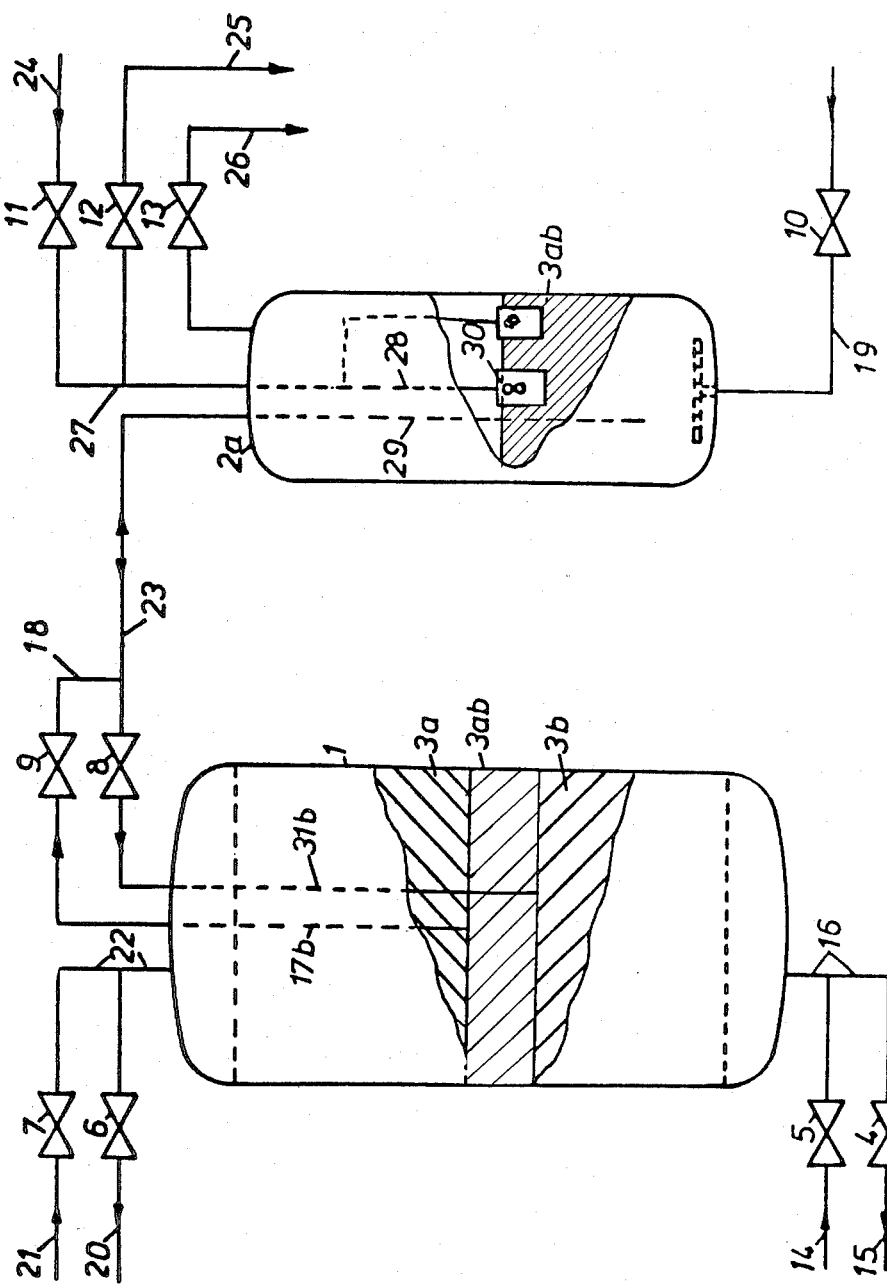
FIG. 3 is a schematic illustration of a mixed-bed liquid treatment system in accordance with the invention which includes an operating column and a storage column.

FIG. 3 depicts the present invention applied to a mixed-bed liquid purification process. In a mixed-bed process, a so-called mixed zone, consisting of unpurified or unregenerated ion-exchange material (indicated at 3ab) is formed during the internal regeneration, the mixed zone being located between upper and lower zones 3a and 3b of cation and anion exchange material. The presence of this mixed zone results in a deterioration of the degree of purity imparted to the raw water which is being treated. In order to avoid such deterioration, after the internal regeneration, contaminated and/or unregenerated ion-exchange material is removed from the mixed zone in the manner described above via the drain tube 17b and delivered to a storage column 2a. Subsequent to the drawing off of the material from the mixed zone, the mixed-bed system is again placed in operation and the desired degree of purity of the treated water will be obtained. Prior to the next regeneration, the material 3 stored in column 2a will be returned to the mixed bed in operating column 1 with transport water, the mixed bed regenerated and the process repeated.

It is to be noted that in the practice of the present invention it is possible to employ several transport water drain/supply conduits 28 in washing column 2 and it is also possible to utilize a plurality of drain tubes 17 and/or feed tubes 31 in the operating column 1. Accordingly, an unhindered feed of ion-exchange or adsorption material to be washed may be achieved, i.e., a system will not be rendered inoperative by a clogging or failure of a single tube.

It is also to be noted that the removal system, i.e., the means by which the material to be washed is withdrawn from operating column 1, can be designed as a distributor, particularly in the case of large filter vessels.

The present invention precipitates numerous advantages over the prior art. By way of example, apparatus to implement practice of the invention is comparatively uncomplicated in construction and thus is characterized by relatively low manufacturing costs. The technique of the present invention is not susceptible to disruption by disturbances, does not require an additional measuring column as has been often used in the prior art and permits the automatic metering of the volume of material withdrawn from the operating column. The present invention also offers the very important advantage of permitting withdrawal of ion-exchange or adsorption material from any height within the operating column.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In a system wherein a liquid to be treated is caused to flow through a bed of treatment material disposed within a vessel, material comprising the bed being periodically withdrawn from the treatment vessel and subsequently returned thereto, an improved material transfer apparatus comprising:

a container for receiving treatment material withdrawn from the treatment vessel;

first conduit means for selectively establishing a material flow path between the vessel and said container;

means for establishing a flow of transport liquid for entraining treatment material and conveying the entrained material through said conduit means from the vessel to said container;

means for exhausting transport liquid from said container, said transport liquid exhausting means including at least a first liquid drain tube extending into said container, said drain tube having at least a first inlet which is permeable to the transport liquid and impermeable to the treatment material, said inlet to said drain tube being disposed intermediate the top and bottom of said container at a position such that the volume of the container including and below said inlet defines the quantity of material to be withdrawn from the vessel, whereby when the entrained material conveyed from said vessel to said container accumulates in said container to said volume, the conveyance of material from the vessel to the container is automatically terminated;

second conduit means for selectively establishing a flow path for treatment material entrained in a transport liquid from said container to the vessel; and means for delivering transport liquid to said container for entraining treatment material therein and causing the flow of said entrained treatment material back to the vessel.

2. The apparatus of claim 1 wherein the vessel contains a bed of ion-exchange material.

3. The apparatus of claim 1 wherein the system is a filtration system and the vessel contains a bed of adsorption material.

4. The apparatus of claim 1 wherein the position of the uppermost inlet to said drain tube is adjustable relative to the container bottom.

5. The apparatus of claim 1 wherein said means for delivering transport liquid to said container in part includes said drain tube.

6. The apparatus of claim 1 wherein said container is a washing column and wherein said apparatus further comprises:

means for selectively creating a flow of washing liquid through the material in said container.

7. The apparatus of claim 6 wherein the position of the uppermost inlet to said drain tube is adjustable relative to the bottom of said container.

8. The apparatus of claim 7 wherein said means for delivering transport liquid to said container in part includes said drain tube.

9. The apparatus of claim 8 wherein the vessel contains a bed of ion-exchange material.

10. The apparatus of claim 8 wherein the system is a filtration system and wherein the vessel contains a bed of adsorption material.

11. The apparatus of claim 8 wherein said first conduit means includes at least a first drain conduit which extends into the vessel and wherein the position of the inlet to said drain conduit is adjustable to permit selection of the region of the bed from which material is to be withdrawn.

12. The apparatus of claim 8 wherein said means for exhausting transport liquid from said container comprises a plurality of liquid drain tubes which extend into said container.

13. The apparatus of claim 12 wherein said first conduit means includes at least first drain conduit which extends into the vessel and wherein the position of the inlet to said drain conduit is adjustable to permit selection of the region of the bed from which material is to be withdrawn.

14. The apparatus of claim 13 wherein said second conduit means includes a treatment material feed tube which extends into the vessel and wherein the position of the discharge end of said feed tube is adjustable to permit selection of the region of the bed to which the treatment material is returned.

15. The apparatus of claim 14 wherein the vessel contains a bed of ion-exchange material.

16. The apparatus of claim 14 wherein the system is a filtration system and the vessel contains a bed of adsorption material.

17. The apparatus of claim 8 wherein said second conduit means includes a treatment material feed tube which extends into the vessel and wherein the position of the discharge end of said feed tube is adjustable to permit selection of the region of the bed to which the treatment material is returned.

18. The apparatus of claim 1 wherein said means for exhausting transport liquid from said container comprises a plurality of liquid drain tubes which extend into said container.

* * * * *